June 30, 1970 G. R. SCHULZ 3,517,893

CARTRIDGE AND TAPE STORAGE BIN

Filed Sept. 16, 1968 2 Sheets-Sheet 1

INVENTOR.
GORDON R. SCHULZ
BY
Jackson & Jones
ATTORNEYS.

CARTRIDGE AND TAPE STORAGE BIN

Filed Sept. 16, 1968 2 Sheets-Sheet 2

INVENTOR.
GORDON R. SCHULZ
BY
Jackson & Jones
ATTORNEYS

United States Patent Office 3,517,893
Patented June 30, 1970

3,517,893

CARTRIDGE AND TAPE STORAGE BIN

Gordon R. Schulz, Tujunga, Calif., assignor, by mesne assignments, to Subscription Television, Inc., New York, N.Y., a corporation of Delaware Filed Sept. 16, 1968, Ser. No. 759,984
Int. Cl. B65h 75/02
U.S. Cl. 242—55.16 17 Claims

ABSTRACT OF THE DISCLOSURE

The present apparatus and method supply a tape from a readily portable cartridge to the storage bin of a tape recorder. The tape is endless and by gripping it along its length and rotating, it is wound into the form of a double spiral coil. The coil is mounted on a rotatable hub which is slidable in a slot in the cartridge housing. By resting the tape coil on spring means carried in the cartridge, the tape coil is lightly tensioned and also urged to maintain a constant relative position with an associated stripper blade which insures direction of the tape from the coil through an adjacent aperture during loading the storage bin with the tape. The recorder is of the type having a bin for storing a tape in random, serpentine folds or loops. A loop of the tape is manually withdrawn from the exit slit, threaded around suitable drive and transducer means and back to the bin through an entrance slit. By attaching the cartridge with its opening adjacent a loading aperture in the recorder bin, the tape can be unwound from the cartridge into the bin.

BACKGROUND OF THE INVENTION

Description of the prior art

Tape recorders employing an endless loop magnetic tape disposed within a tape storage bin are known in the prior art. It is common practice in the prior art to load a storage bin of such recorders from a conventional reel of tape i.e. a reel containing many single layers, of spirally wound tape. The end of the tape is threaded into a slot in the side of the storage bin, through the storage bin tape exit slit, through the tape driving mechanism, and back through a reentry slit into the storage bin. The tape driving mechanism is then energized to remove tape from the reel. A counter monitors the number of feet removed from the reel of tape. When the desired footage is removed from the reel, the two loose ends of the tape are spliced together to form an endless loop.

The foregoing prior art approach suffers from numerous disadvantages heretofore unsolved prior to the advent of this invention. For example, the technique of splicing two tape ends so as to form an endless loop involves a sophisticated technique which requires highly skilled artisans and expensive tape splicing equipment. Such skilled artisans and equipment are generally available only at production facilities. It is extremely difficult and costly to replace endless loops in the field because the tape splicing equipment and skilled artisans are not readily available. Even when available, the splicing operation introduces excessive tape handling which may damage the tape's magnetic layer so that excessive data drop-outs occur.

Many endless loops in use today are of great length. These loops are tightly wound in serpentine fashion in the storage bin. In the prior art there is no known satisfactory manner of unloading such endless tape loop. A common prior art practice is to dump the endless loop into a container, and thereafter the loop is manually wound on a reel. This prior art dumping operation involves the chance of tape spillage, or tape knotting. In either event, kinks, creases or damage to the magnetic coating may result. Any imperfection in the magnetic layer tends to increase the chances for losing vital information recorded on the tape.

In the prior art there is no known satisfactory manner of unloading an endless tape loop. Where the information recorded on the tape may be duplicated at a reasonable cost, the tapes are generally thrown away. Where the tape contains vital information such as instrument recordings, the endless loop is dumped into a container, cut and then manually wound on a reel. Many endless tape loops in use today, however, are of great length. In use such loops become tightly wound in serpentine fashion in the storage bin. The unloading operation involves risk of tape spillage or kinking. Kinks, creases or damage to the magnetic coating caused by the unloading or rewinding operation may result in the loss of vital information.

The disadvantages of the prior art procedures and apparatus for loading and unloading endless tape loops into tape recorder storage bins have been overcome by the present invention.

SUMMARY OF THE INVENTION

In accordance with the present invention, a magnetic recording apparatus with an endless tape storage bin is loaded with tape from a cartridge containing an endless tape. The storage bin includes an aperture into which an end loop of tape from the cartridge is inserted. The bin also includes an exit slit and re-entrant slit through which one layer of tape is threaded to engage a tape driving means such as a capstan. The capstan drives the tape past a transducer adapted to read or write signals on the tape. The recording apparatus includes means for supporting the cartridge adjacent the bin aperture.

The tape cartridge for delivering magnetic tape to the storage bin includes a housing containing a rotatably mounted spool. A double layer of endless loop of magnetic tape is wound on the spool with one end loop passing through an outlet opening in the housing. A stripper member is provided for guiding the tape from the spool to the outlet opening. The stripper member and the spool are mounted in the housing to permit relative movement between the two parts so that the stripper member may engage the inner one of a double layer of tape being removed from the spool to prevent kinking of the inner layer or deformation of the tape roll within the housing.

To load an endless tape storage bin in accordance with the present invention, a spool of double wound endless tape is positioned adjacent the aperture in the storage bin. The free end of the continuous tape loop from the spool is inserted through the bin aperture. The tape is then threaded through the bin exit slit across the transducer and tape drive means and back through the bin re-entrant slit. The tape drive means is then operated to transfer the remaining tape on the spool to the storage bin.

To unload the storage bin in accordance with the present invention, the tape is removed from the bin exit and re-entrant slit. One section of the tape is inserted through the aperture in the storage bin and secured to a spool positioned adjacent the aperture. The spool is then rotated until the tape has been removed from the storage bin and wound on the spool.

DESCRIPTION OF THE PREFERRED EMBODIMENT

Figure 1:
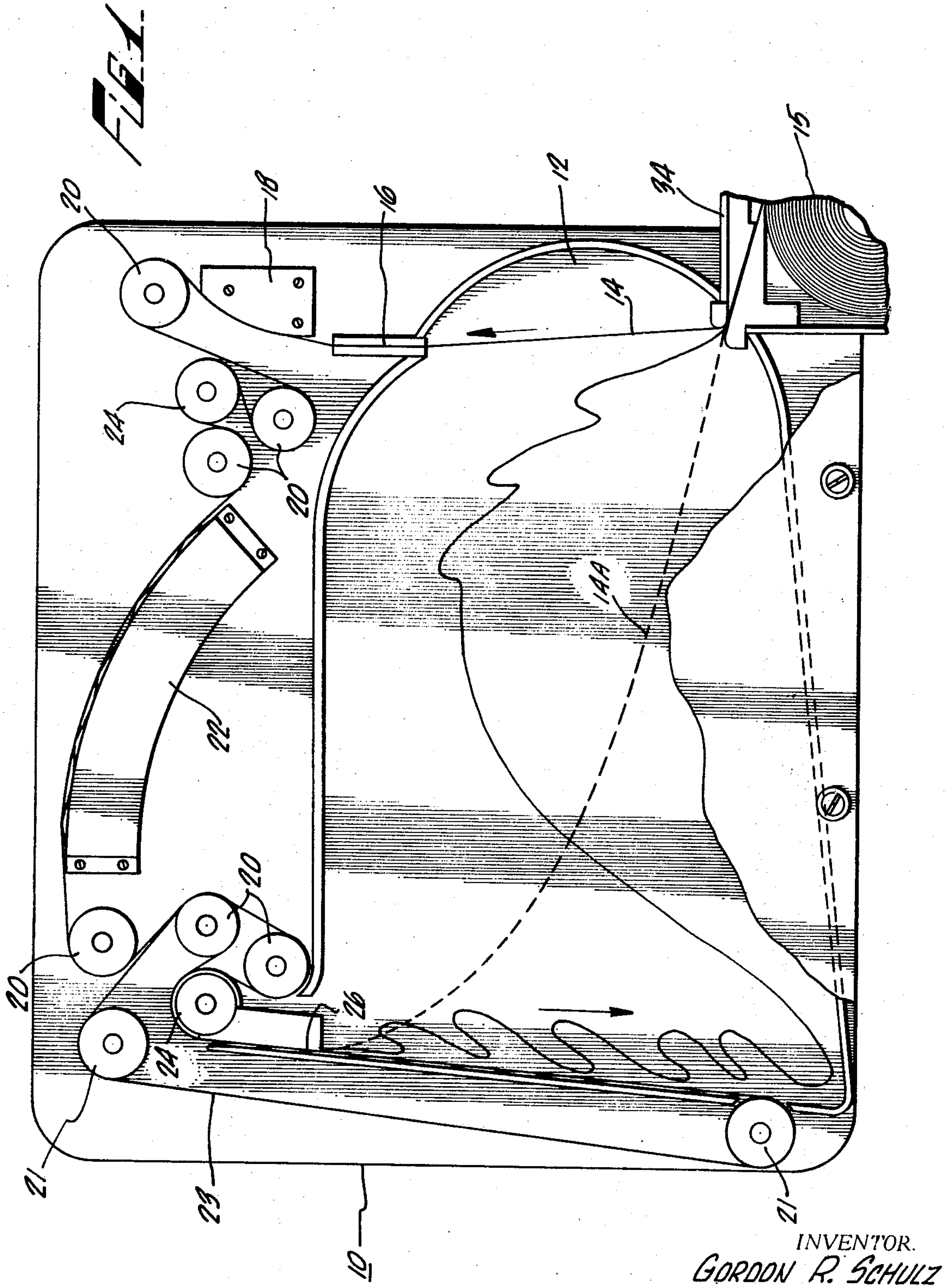
FIG. 1 is a plan view partially broken away of a tape recorder having an endless tape storage bin and a tape loop cartridge in accordance with the principles of this invention.

Referring now to FIG. 1, a tape recorder 10 includes an endless tape storage bin 12. An endless tape 14 is threaded through a tape exit slit 16 in the bin past a stationary guide 18, guide rollers 20, transducers 22, capstans 24 and back into the bin through a re-entrant slit 26. A Mylar belt 28 is driven by capstan 24 through the bin re-entrant slit 26 along wall 27 of the bin. Rollers 20 and 30 guide belt 28 is a conventional manner. When capstan 24 drives belt 28, the belt acts as a moving wall to store the tape 14 in a serpentine fashion in bin 12. Bin 12 includes an aperture 32 in which a tape cartridge 34 is releasably inserted.

To load the bin 12, the top 13 is removed or opened. An outside end loop of tape from roll 15 in cartridge 34 is manually drawn into bin 12. The outside loop is initially made sufficiently long so that the outermost tape layer may be threaded through the bin exit slit 16 past the guide rollers 20, transducers 22, capstans 24, and back into the bin re-entrant slit 26. The dashed tape line 14 symbolically indicates the tape's return to cartridge 32 for this initial loop.

The top lid 13 is replaced and the tape drive mechanism is then energized to continuously pull the outermost layer of tape from tape roll 15 into bin 12 through the slits 16 and 26. The innermost layer of each double layer of tape wound off from roll 15 is also drawn into the bin 12. The inner and outer layers of tape form serpentine loops in bin 12 as illustrated in FIG. 1. Bin 12 fills from the left and right sidewalls toward the middle in closely packed rows of serpentine loops.

Figure 2:
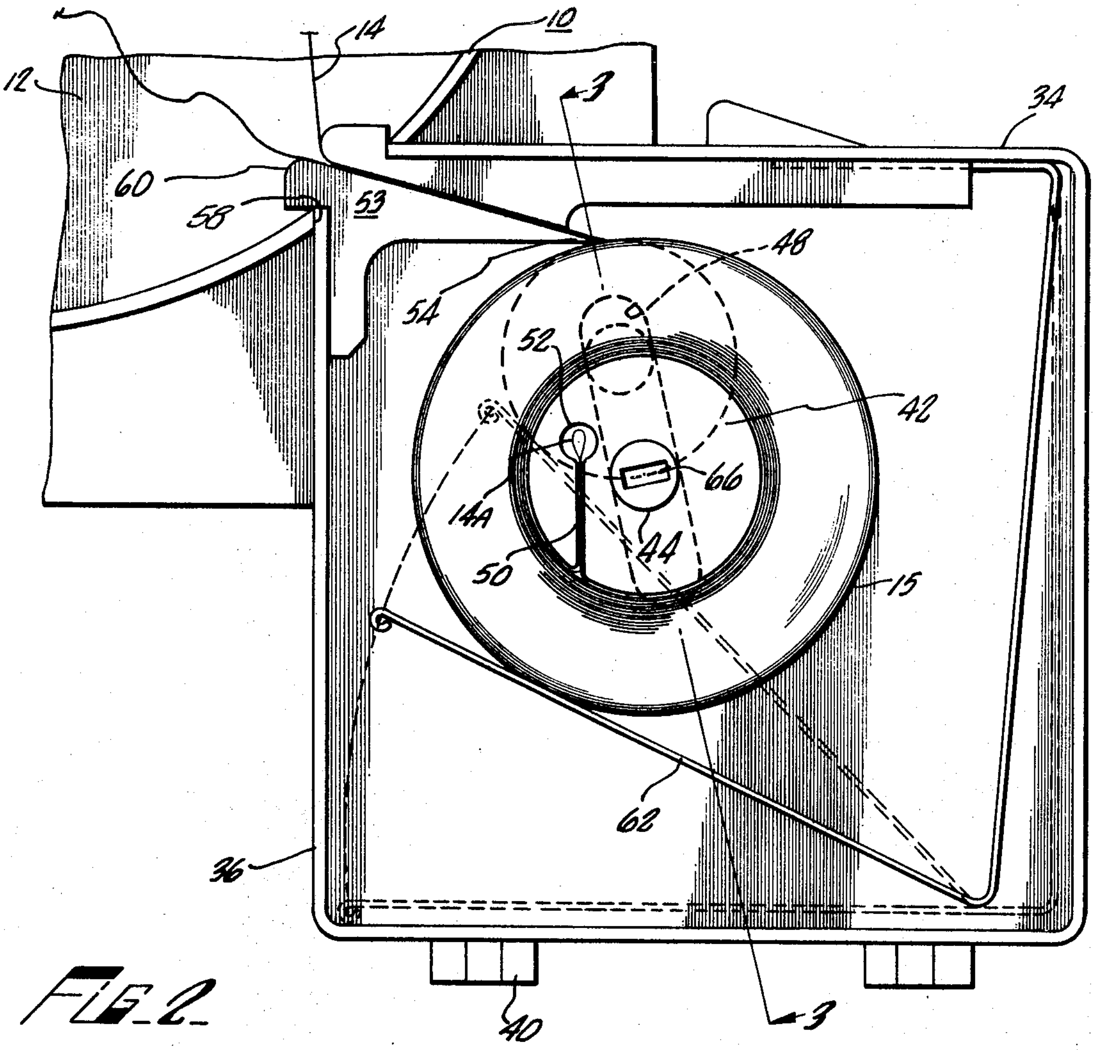
FIG. 2 is a plan view with the top lid removed from a tape cartridge suitable for delivering tape to an endless storage bin.
Figure 3:
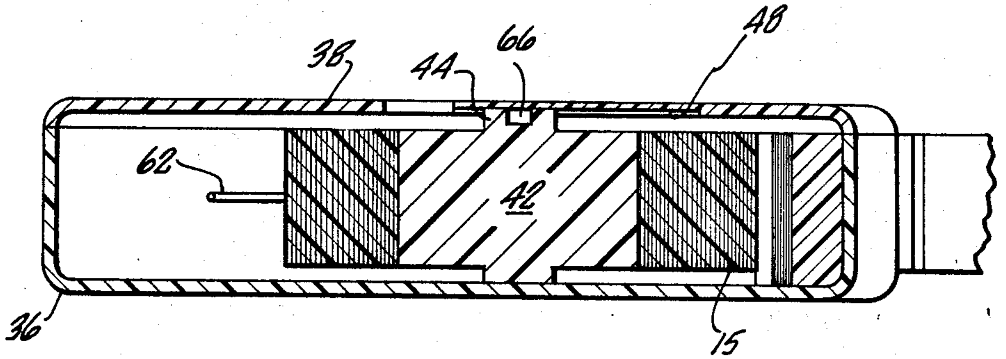
FIG. 3 is a sectional view of a tape cartridge taken along lines 3—3 of FIG. 2 with the top lid in place.

In FIG. 1 only a portion of the cartridge 34 is shown. FIG. 2 depicts a complete cartridge 34 with the top removed for clarity. In FIG. 2 the lower corner of the tape recorder 10, of FIG. 1, is repeated.

Cartridge 34, FIG. 2, includes a housing 36. Located within housing 36 is a stripper 53. Stripper 53 includes a stripper blade 54. Stripper blade 54 strips the inner layer of each double layer of tape from tape roll 15, and causes the inner layer to follow the outer layer through the guide channel 56. Continuous contact between the stripper blade 54 and the outermost layer of tape roll 15 prevents tape kinking and further prevents tape roll deformation from occurring within the housing 36. The loading operation continues to remove tape from roll 15 wound on spool 42 until all of the tape has been removed from spool 42. As tape is removed from spool 42, spring 62 urges roll 15 and spool 42 against stripper blade 54. A slot 48 shown in dashed lines in FIG. 2 is provided in either or both of the top and bottom lids of housing 36. This slot 48 slidably receives the spool hub 44 so that bias force from spring 62 urges the roll 15 against the stripper blade as the roll's size decreases during the bin loading operation. The axis of the slot 48 is perpendicular to the tangent of the tape roll 15 at the point of engagement with the stripper blade 54 to reduce the tendency of the tape to kink during the unwinding process. Dashed lines for spool 42, hub 44 and spring 62 show an empty spool's position. With a full tape roll 15 the spring 62, as is also shown in dashed lines, would be in the right angle position against the right and bottom sides of housing 36.

As spool 42 empties the inner end 14A is drawn into bin 12 and the loading operation is completed. At this time the cartridge 34 with its empty spool may be removed from the bin aperture 32.

When it is desired to unload the tape from the bin 12, the cartridge 34 with an empty spool is reinserted into the bin aperture 32. The tape 14 is removed from the bin exit and re-entrant slits, the guide rollers, capstans, transducers, etc. A section of the tape forming a small loop is then threaded through the guide channel 56 and the slot 50 until the tape end rests in the cylindrical aperture 52 in the spool 42. At this time the spool is moved along the groove 48 until the hub 44 is aligned with an aperture 64 in the housing cover 38. A suitable shaft with a projecting key which matches a slot 66 in the end of the hub 44 is inserted through the opening 64 to engage the hub 44. The shaft is rotated to wind the double layered tape onto the spool 42. During this unloading operation the spring 62 maintains pressure on the outer surface of the tape on the spool to cause the tape to be wound on the spool in a compact manner.

The cartridge 34 is supported on the recorder by means of bin edge portions or shoulders 58 which define the aperture 32. The cartridge housing 38 includes a pair of enlarged corner portions 60 which are held by the shoulders 58 as illustrated.

It should be noted from FIG. 1 that the most advantageous location for aperture 32 is in the portion of the storage bin wall that is remotely opposite from the re-entrant slit 26. At the depicted location for aperture 32 the stripped tape 14 is in substantial line of sight relationship with the tape exit slit 16. There is, thus, little likelihood of binding the tape being drawn into bin 12 when the aperture is located away from the re-entrant slit 26.

It is to be understood that the foregoing features and principles of this invention are merely descriptive and that departures and variations thereof are possible by those skilled in the art, without departing from the spirit and scope of this invention.

What is claimed is:

1. In a magnetic tape recording apparatus for receiving tape from a cartridge containing a spool of double wound endless tape, the combination which comprises:
- and endless loop tape storage bin having an exit slit, a re-entrant slit and an aperture for receiving a tape loop,
- a transducer responsive to signals recorded on the tape,
- tape driving means for moving the tape through the exit slit past the transducer and through the re-entrant slit, and
- means for releasably supporting the cartridge adjacent the tape receiving aperture, whereby the tape from the spool may be loaded into the storage bin.

2. The combination as defined in claim 1 wherein the aperture is adapted to receive a portion of the cartridge and the means for supporting the cartridge include a pair of shoulders which define the aperture.

3. A tape cartridge for delivering magnetic tape to an endless tape storage bin which comprises:
- a housing,
- a spool rotatably mounted in the housing,
- an endless loop of magnetic tape wound in a double layer on the spool,
- the housing defining an outlet opening for the removal of the tape from the spool,
- a stripper member for guiding the tape from the spool to the outlet opening, and
- means for mounting the spool and the stripper member on the housing to permit relative linear movement therebetween, whereby the stripper member may engage the inner layer of tape being removed from the spool adjacent the spool to prevent kinking of the tape when the tape is unwound.

4. The combination as defined in claim 3 wherein the spool is mounted for linear movement relative to the housing.

5. The combination as defined in claim 4 wherein the stripper member includes a stripper blade and a guide channel and further includes means for biasing the spool against the stripper blade.

6. The combination as defined in claim 5 including guide means for guiding the linear movement of the spool along an axis which is perpendicular to the tangent to the tape periphery at the point of contact with the stripper blade.

7. A storage bin tape recorder and a tape loading and unloading cartridge for the recorder comprising:

an endless loop tape storage bin having an exit slit, a re-entrant slit and an aperture for receiving a tape loop, tape driving means for moving tape through the exit and re-entrant slits, a tape cartridge for delivering magnetic tape to said storage bin, said cartridge comprising:

a housing, a spool rotatably mounted in the housing, an endless loop of magnetic tape wound in a double layer on the spool, the housing defining an outlet opening for removal of the tape from the spool, a stripper member for guiding the tape from the spool to the outlet opening; and means for releasably supporting the cartridge adjacent the tape receiving aperture in the storage bin wall.

8. The apparatus of claim 7 and further comprising in said cartridge:

means for slidably mounting the spool in said housing for relative linear movement of said spool and said stripper.

9. The apparatus of claim 8 wherein said stripper member includes a stripper blade and a guide channel and further includes means for biasing the spool against the stripper blade.

10. The apparatus of claim 8 including guide means for guiding the linear movement of the spool along an axis which is perpendicular to a tangent plane at the tape periphery at the point of the tape roll's contact with the stripper blade.

11. The apparatus of claim 10 wherein said guide means is a recessed slot in at least one covering portion of said housing.

12. The apparatus of claim 9 wherein said biasing means is a spring mounted in said housing and loaded at a point opposite said stripper to urge the tape roll and spool toward the stripper as tape is unwound from the spool.

13. The apparatus of claim 7 wherein said tape loop receiving aperture is located at a portion of the bin wall opposite from the re-entrant slit.

14. A method of loading a tape recorder of the endless tape storage bin type comprising the steps of:

winding a double layer endless tape having two end loops formed by the double layers in a flat Archimedes roll, with one end loop at the rolls center and the other end loop at the rolls outer surface, introducing the outer end loop through an opening in a storage bin of the recorder, threading one layer of the introduced loop through tape exit and re-entrant slits of the storage bin and across selectively energizable tape moving means of the recorder, and energizing the tape moving means to transfer the tape from the Archimedes roll into serpentine layers in the storage bin.

15. A method of unloading the tape recorder loaded in accordance with claim 14 comprising the steps of:

removing the one layer from its threaded path;

pulling an end loop formed by a double layer of tape through the aperture in the storage bin; and winding the end loop and the rest of the endless tape in a double layer flat Archimedes roll.

16. A method of loading a tape recorder of the endless tape storage bin type from a roll containing an endless tape wound thereon in a double layer wherein the storage bin includes a tape exit slit, a tape re-entrant slit and an aperture for receiving a free end of a tape to be loaded in the bin comprising the steps of:

introducing the outer end loop through the aperture in the storage bin of the recorder, threading one layer of the introduced loop through tape exit and re-entrant slits of the storage bin and across selectively energizable tape moving means of the records, and energizing the tape moving means to unwind the tape from the roll and transfer the tape into the storage bin.

17. The method as defined in claim 16 wherein said one layer is the outermost layer on the roll.

References Cited

UNITED STATES PATENTS

| | | | |
|---|---|---|---|
| 2,215,578 | 9/1940 | Eggert et al. | 242—55.16 XR |
| 2,995,313 | 8/1961 | Namenyi-Katz | 242—55.16 |
| 3,032,287 | 5/1962 | Namenyi-Katz | 242—55.17 |
| 3,281,042 | 10/1966 | Hardison et al. | 226—118 |
| 3,323,230 | 6/1967 | Cooper | 226—118 XR |

FOREIGN PATENTS

| | | |
|---|---|---|
| 1,291,235 | 3/1962 | France. |

BILLY S. TAYLOR, Primary Examiner

U.S. Cl. X.R.

226—118; 242—68.7